United States Patent [19]

Ursel et al.

[11] Patent Number: 5,178,237
[45] Date of Patent: Jan. 12, 1993

[54] POWER-ASSISTED PARKING BRAKE FOR VEHICLES

[75] Inventors: Eckhard Ursel, Buehl; Uwe Schaper, Buehl-Vimbuch, both of Fed. Rep. of Germany

[73] Assignee: Robert Bosch GmbH, Stuttgart, Fed. Rep. of Germany

[21] Appl. No.: 714,394

[22] Filed: Jun. 12, 1991

[30] Foreign Application Priority Data

Sep. 1, 1990 [DE] Fed. Rep. of Germany ....... 4027810

[51] Int. Cl.⁵ ............................................. F16D 65/36
[52] U.S. Cl. ................................ 188/106 P; 188/157; 74/388 R; 74/625; 74/535; 74/538
[58] Field of Search .................... 188/156, 162, 106 P, 188/106 F, 157; 74/388 R, 625, 535, 538

[56] References Cited

U.S. PATENT DOCUMENTS

| | | | |
|---|---|---|---|
| 3,000,476 | 9/1961 | Barry | 188/162 |
| 3,204,725 | 9/1965 | McGraw, Jr. | 188/156 |
| 3,455,418 | 7/1969 | Littmann | 188/106 F |
| 3,539,038 | 11/1970 | Taber | 188/162 |
| 3,875,820 | 4/1975 | Morder | 74/625 X |
| 5,067,366 | 11/1991 | Gandiglio | 74/625 X |

Primary Examiner—Douglas C. Butler
Assistant Examiner—Lee W. Young
Attorney, Agent, or Firm—Edwin E. Greigg; Ronald E. Greigg

[57] ABSTRACT

A power-assisted hand brake for motor vehicles, which can be operated in an automatic and power-assisted mode with the aid of an electric motor. If the power assisted brake fails, a conventional parking brake is operated mechanically to apply emergency brakes. The handbrake includes a rotatable spindle with a threaded nut thereon which operates the brake by use of the motor. A carrier plate and pivot plates function to disconnect the nut so that a hand-operated lever can be used to manually operate the brake.

7 Claims, 1 Drawing Sheet

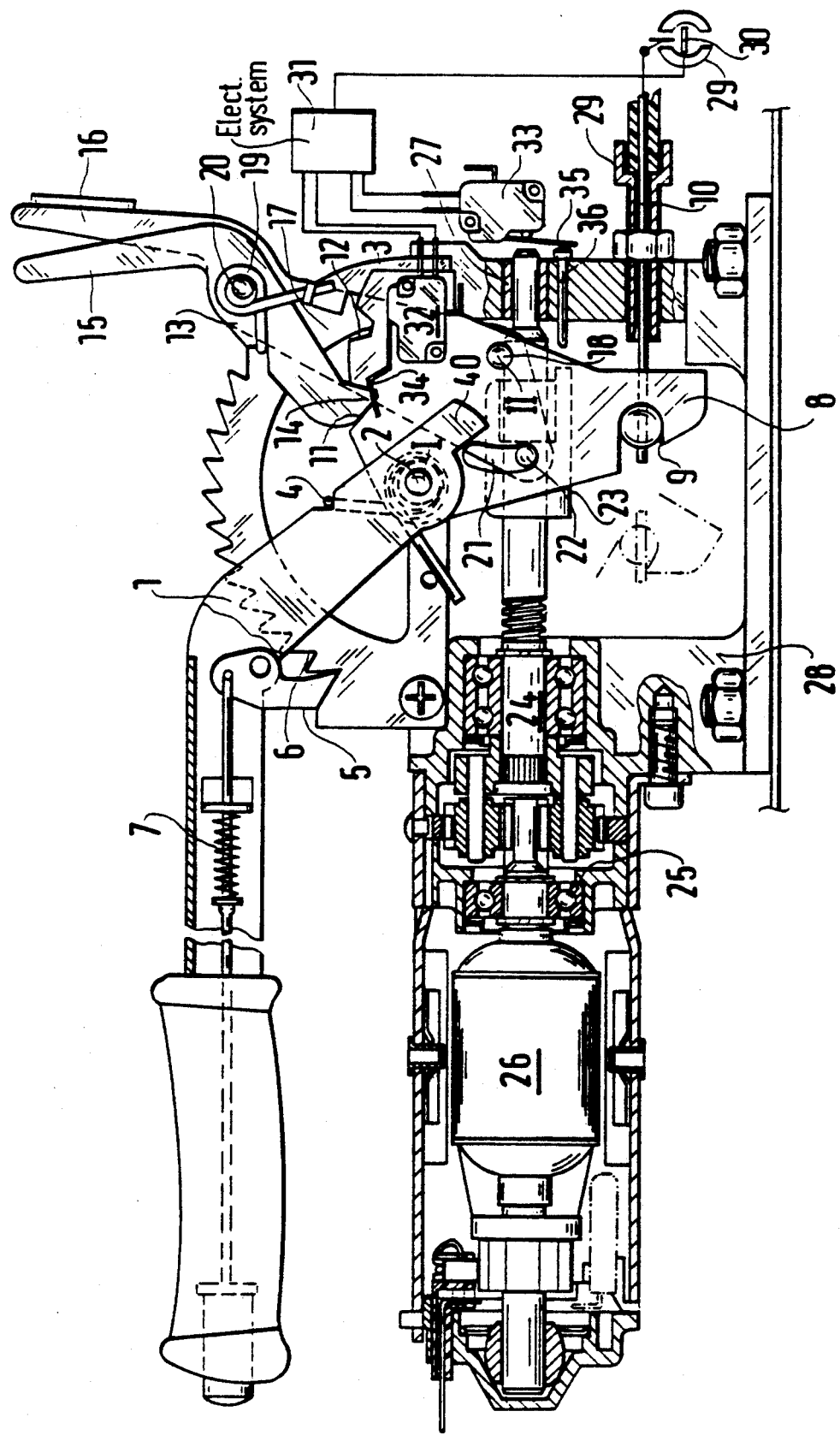

5,178,237

POWER-ASSISTED PARKING BRAKE FOR VEHICLES

BACKGROUND OF THE INVENTION

The invention relates to a power-assisted parking brake. In a known parking brake of this type (International Application WO 90/03 905), the brake actuation force is produced with the aid of an electric motor. There is no provision for adaptation to a manually initiated mechanical actuation.

OBJECT AND SUMMARY OF THE INVENTION

The power-assisted parking brake of the invention has the advantage over the prior art that it is readily actuatable by hand if the power assistance fails. Another advantage is that if the apparatus is intact, starting the car on a hill is easier, because one-handed steering is unnecessary. Moreover, when parking the car, the driver need merely touch the parking brake, rather than actuate it fully. The vehicle is prevented from rolling away in any case. Finally, because of the automatic system, overtightening of the brake cable is reliably avoided.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention.

DESCRIPTION OF THE PREFERRED EMBODIMENT

For its actuation, a parking brake has a manual brake lever 1, which is capable of acting, via a multiple-part rod linkage, on a Bowden cable connected to a wheel brake. An electric motor is also provided, with which the assisting power can be fed to the Bowden cable.

The manual brake lever 1 is pivotably supported on a detent plate 3 by means of a bolt 2 and can be forced toward its initial position (shown) by means of a restoring spring 4 fixed to the detent plate 3. The bolt 2 forms a pivot point I. Also rotating about this pivot point I is a carrier protrusion 40 of the manual brake lever 1, the significance of which will be discussed later. A rachet pawl 5 is also supported on the manual brake lever 1 and typically meshes with a set of teeth 6 that is disposed in a curve on the detent plate 3. The rachet pawl 5 can be released by means of a pin 7 resiliently supported in the manual brake lever 1 and suspended from the rachet pawl 5.

Two congruent carrier plates 8 are supported on the front and back of the same bolt 2, as the manual brake lever 1, and are provided with an eyelet 9 for suspending a Bowden cable 10.

The carrier plate 8 has two detents 11 and 12, which can be engaged by a detent lever 13 with a tooth 14. On its end opposite the tooth 14, the detent lever 13 has a lever 15 that protrudes outward and is adjacent to two further levers 16, which are formed onto two likewise congruent pivot plates 17. A pin 18 penetrates the plates 17 and 8 which forms a pivot location for them, with a pivot point II. The detent lever 13 and the pivot plates 17 are coupled to one another by a torsion spring 19 and a bearing pin 20. On their ends 21 opposite the levers 16, each of the pivot plates 17 has one carrier 22, and the carriers rest on lateral guides of a threaded nut 23.

The threaded nut 23 is threaded on a rotary spindle 24, which is coupled to a shaft of an electric motor 26 via a bearing 25. On its free end, the spindle 24 is received by a further bearing 27, and both bearings 25 and 27 are secured in a base body 28 that also carries the detent plate 3 and a duct 29 for the Bowden cable 10.

The Bowden cable 10 leads to a wheel brake 29 and serves to actuate it. A sensor 30 is provided for ascertaining the particular brake actuation force necessary to park the vehicle. Signals of the sensor 30 are evaluated in an electronic system 31 for switching the electric motor 26 on and off.

Two switches 32 and 33 are connected to the electronic system 31 and actuated via contacts 34 and 35. One contact 34 touches the tooth 14 of the detent lever 13 when the tooth has snapped into place into the detent 11 of the carrier plate 8, and the other contact 35 is actuated by a pin 36 in the terminal position of the threaded nut 23.

The parking brake described functions as follows:

Automatic mode

With the aid of a switch, not shown, the electric motor 26 is switched on. The rotary spindle 24 turns. Via the longitudinal motion of the threaded nut 23, the Bowden cable 10 is actuated by the carrier plate 8 and produces braking force. The positive engagement is effected upon contact of the carrier 22 with the threaded nut 23. The force necessary for pulling the brake as required is sensed by the sensor 30. The resultant signal is used by the electronic system 31 for regulating the electric motor 26. The detent lever 13 must be in the detent 11 of the carrier plate 8, for this operating state. The manual brake lever 1 has no function in this mode.

Power-assisted mode

To simulate conventional manual braking, a switch between the automatic mode and the power-assisted mode can be made with an electric switch that is located at some suitable point. For this operating state as well, the detent lever 13 remains at the detent 11. The braking operation can now be initiated with the manual lever 11 via a potentiometer, which is secured at pivot point 1. The Bowden cable force is regulated via the electronic system, by means of the potentiometer and the sensor 29.

Mechanical auxiliary mode

If electric manual braking should no longer be possible, because of some defect in the electronic system or the motor, then a mechanical auxiliary mode can be attained by shifting the detent lever 13 to the other detent 12. In this shift, the carrier 22 is moved out of contact range of the threaded nut 23 by means of the pivot plate 17. Thus, the entire electrical region is decoupled from the braking operation. Mechanical braking in the conventionally known manner is brought about by contact of the carrier 22 with the carrier protrusions 40 of the manual brake lever 1. The advantage of the invention is the electrically regulated braking, which makes one-handed steering unnecessary when starting up on a hill, as well as the automatic tightening of the hand brake upon parking, which prevents the vehicle from unintentionally rolling away. As the result of the use of the sensor 30, the Bowden cable 1 is not unduly tensed in the power-assisted mode.

The foregoing relates to preferred exemplary embodiment of the invention, it being understood that other variants and embodiments thereof are possible within the spirit and scope of the invention, the latter being defined by the appended claims.

What is claimed and desired to be secured by letters patent of the United States is:

1. A power-assisted parking brake for vehicles, having means for actuating the brakes and having an electric motor to generate a power assistance, a mechanical manual force and the electric motor power assistance can be introduced parallel into a lever linkage (8, 13, 17), and that the linkage (8, 13, 17) has a pivotable carrier plate (8) and two pivot plates (17), to which the brake actuating means is secured and which is actuatable in the braking direction both by the electric motor (26), and upon failure of a power assistance, by a manual brake lever (1), the electric motor (26) is coupled to a rotary spindle (24), and a threaded nut (23) is mounted on the rotary spindle (24), lateral guides prevent said threaded nut from rotating, by which a longitudinal motion is imparted in a direction of an actuation of the carrier plate (8), and said two pivot plates (17) are disposed in the linkage, which if the power assistance fails, disconnect the carrier plate (8) from its connection with the threaded nut (23) and drivers (22) disposed on the pivot plates (17) are pressed against driver protrusions (40) of the handbrake lever (1), as a result of which the necessary brake force is brought to bear solely via the manual brake lever (1).

2. A power-assisted braking brake as defined by claim 1, in which a sensor (30) for ascertaining a necessary brake actuation force is disposed inside the wheel brake actuatable via the brake actuating means, and that signals of the sensor (30) can be evaluated, in an electronic system (31), for switching the electric motor (26).

3. A power-assisted parking brake as defined in claim 2, in which said brake actuating means is a Bowden cable.

4. A power-assisted parking brake as defined in claim 1 in which said brake actuating means is a Bowden cable.

5. A power-assisted parking brake for vehicles, having means for actuating the brakes and having an electric motor to generate a power assistance, a mechanical manual force and the electric motor power assistance can be introduced parallel into a lever linkage including a pivotable carrier plate (8), a detect lever (13), and two pivot plates (17), each of which includes one carrier (22), to which the brake actuating means is secured and which is actuatable in the braking direction both by the electric motor 26, and upon failure of a power assistance, by a manual brake lever (1) that includes driver protrusions (40) on one end, the electric motor (26) is coupled to a rotary spindle (24), and a threaded nut (23) is mounted on the rotary spindle (24), lateral guides prevent said threaded nut from rotating, said carrier plate (8) includes first and second detents (11, 12), said detent lever (13) is connected to the pivot plates (17) and includes a tooth (14) which for a power assist snaps into said detent (11) which connects the carrier plate (8) with the threaded nut (23) by which a longitudinal motion can be imparted in a direction of an actuation of the carrier (8) by the electric motor, if the power assist fails, said two pivot plates (17) move said tooth (14) on said detent lever (13) which snaps into said detent (12) thereby disconnecting said carrier plate from said threaded nut by use of said carriers (22) pressed against said driver protrusions (40) on said handbrake lever (1) which permits manual operation of said brake by said handbrake lever (1).

6. A power-assisted parking brake as defined by claim 5, in which a sensor (30) for ascertaining a necessary brake actuation force is disposed inside the wheel brake actuatable via the brake actuating means, and that signals of the sensor (30) can be evaluated, in an electronic system (31), for switching the electric motor (26).

7. A power-assisted parking brake as defined in claim 5, in which said brake actuating means is a Bowden cable.

* * * * *